Patented Apr. 4, 1950

2,503,059

UNITED STATES PATENT OFFICE 2,503,059

2-(N:N-DIPHENYL-AMINOMETHYL)-IMIDAZOLINES

Karl Miescher, Riehen, and Adrian Marxer and Ernst Urech, Basel, Switzerland, assignors to Ciba Pharmaceutical Products, Inc., Summit, N. J.

No Drawing. Application January 27, 1948, Serial No. 4,705. In Switzerland January 31, 1947

10 Claims. (Cl. 260—309.6)

1

The present invention relates to 2-(N:N-diphenyl-aminoalkyl)-imidazolines, such as 2-(N:N - diphenyl - aminomethyl) - imidazolines, which contain at least one substituted or unsubstituted hydroxyl group in one of the phenyl radicals and to the preparation thereof. The phenyl radicals may contain further substituents, for example, alkyl radicals, such as methyl, ethyl or propyl radicals. The imidazoline residue may also contain substituents, for example, alkyl radicals, such as methyl, ethyl or propyl radicals. When the hydroxyl group is substituted it may be, for example, a hydroxyl group etherified with an alcohol, such as an aliphatic, alicyclic or araliphatic alcohol, or a hydroxyl group esterified with an organic acid, such as an aliphatic or aromatic acid, for example, a methoxy, ethoxy, benzyloxy, acetoxy, propionyloxy or benzoyloxy group.

The invention is concerned, more especially, with the manufacture of compounds of this kind in which the substituted or unsubstituted hydroxyl group occupies the meta-position as for example, of 2 - [N - (para-methyl - phenyl) - N - (meta'-hydroxy-phenyl)-aminomethyl] - imidazoline. The new imidazolines of the present invention are characterized by especially pronounced sympatholytic activity, which makes them of considerable therapeutic interest.

The new imidazolines are made by reacting a reactive ester of a 2-hydroxyalkyl-imidazoline with a diphenylamine containing at least one substituted or unsubstituted nuclear hydroxyl group.

As reactive esters of 2-hydroxylalkyl-imidazolines there are used, more especially, those of strong inorganic or organic acids such, for example, as hydrohalic acids and alkyl or aryl sulphonic acids. These esters are preferably reacted in the form of their salts. If the starting materials contain substituted hydroxy groups, the N-metal compounds, such as sodium compounds, of these diphenylamines may be used. The reaction may be carried out in the presence or absence of a diluent and/or a condensing agent.

In a modification of the invention an N:N-diphenyl-aminoalkane carboxylic acid or a reactive acid derivative thereof, which contains at least one substituted or unsubstituted nuclear hydroxyl group, is reacted with an alkylene-diamine of which the amino groups are bound to vicinal carbon atoms.

As derivatives of the acids there may be used, for example, imido-ethers, imido-halides, thioamides, thioimidoethers, amides, esters, halides, amidines or nitriles. Instead of using the acid derivatives themselves as starting materials the process may be conducted under such conditions that the derivatives are formed in the course of the reaction. Thus, it is possible to use, instead of a thioamide, a corresponding nitrile in the presence of hydrogen sulphide. In this case the hydrogen sulphide may also be formed in the course of the reaction from agents yielding hydrogen sulphide, such as carbon disulphide, phosphorous pentasulphide, an alkali sulphide, an ammonium sulphide, iron sulphide or aluminum sulphide, if desired, in the presence of a small quantity of water. If the nitrile is reacted directly with the alkylene-diamine, the latter is used preferably in the form of a mono-salt thereof. The alkylene diamines may be substituted at the carbon, for example by an alkyl group such as a methyl, ethyl or propyl group. They may also contain substituents at the nitrogen. Thus, for example, N:N'-ethylene urea may be brought into reaction.

The reaction conditions may vary according to the starting materials used. Thus, the reaction may be conducted in the presence or absence of a diluent and/or a condensing agent, at a lower or higher temperature, and at different pressures. Furthermore, one of the reaction components may be used in excess; thus in one form of the process for reaction with an N:N-diphenyl-aminoalkane carboxylic acid and excess of an alkylene-1:2-diamine may be used. The process may also be carried out in two stages, for example, by first forming the acyl-derivative of the alkylene-1:2-diamine and heating the acyl-derivative with an agent capable of splitting off water, such as calcium oxide.

An acyloxy group present in the compounds obtained by the invention may be converted into a free hydroxyl group by treatment with a hydrolyzing agent, or, for example, an aralkoxy group, such as a benzyloxy group, may be converted into a free hydroxyl group by means of catalytically activated hydrogen or by means of a hydrolyzing agent. From compounds containing free hydroxyl groups there may be obtained by treatment with esterifying or etherifying agents, esters, for example, of aliphatic acids such as acetic acid, propionic acid or butyric acid, or of aromatic acids such as benzoic acid. There can also be obtained ethers, for example, alkyl ethers or aminoalkyl ethers. The imidazolines so obtained easily form salts with inorganic or organic acids, for example, with hydrohalic acids such as hydrochloric acid, or with sulphuric acid, phosphoric acid, methane sulphonic acid, or toluene sulphonic acid, acetic acid or the like.

It is intended to use the products of the invention as medicaments.

The following examples illustrate the invention, the parts being by weight unless otherwise stated and the relationship of parts by weight to parts by volume being the same as that of the gram to the cubic centimeter:

*Example 1*

160.0 parts of N-(para-methyl-phenyl)-meta'-methoxy-phenylamine and 38.75 parts of 2-chloromethyl-imidazoline hydrochloride are heated in an oil bath having a temperature of 150° C., and maintained at this temperature for 10 hours while stirring and introducing a current of nitrogen. After cooling, the whole is treated with 400 parts by volume of warm water, and the N-(para-methyl-phenyl)-meta'-methoxy-phenylamine which has been used in excess is separated from the mixture by repeated extraction with ether. The aqueous extract is evaporated under reduced pressure. An oily hydrochloride remains behind which can be purified, for example, in the following manner: The product is taken up in water and the free base is liberted by means of dilute aqueous sodium carbonate solution. The base is extracted with a mixture of chloroform and ether. After evaporating the solvent, 2-[N-(paramethyl-phenyl)-N-(meta'-methoxy-phenyl)-aminomethyl]-imidazoline of the formula

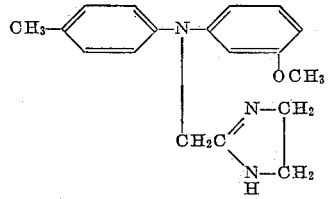

remains behind. It is dissolved in 400 parts by volume of benzene and stirred with 200 parts of aluminum oxide. After filtering with suction to separate the aluminum oxide, and washing the latter with benzene the solvent is evaporated. The base so obtained crystallizes and has a melting point of 91–93° C. It is converted without further purification into its hydrochloride by means of alcoholic hydrochloric acid and ethyl acetate. By recrystallization from a mixture of alcohol and ethyl acetate the pure hydrochloride melting at 148–151° C. is obtained.

*Example 2*

199.24 parts of N-(para-methyl-phenyl)-meta'-hydroxy-phenylamine and 77.52 parts of 2-chloromethyl-imidazoline hydrochloride are heated for 16 hours in an oil bath having a temperature of 150° C., while stirring and introducing a current of nitrogen. The viscous contents of the flask are then cooled to about 100° C., mixed with 400 parts by volume of hot water, and stirred for a short time. After further cooling to about 60° C., 200 parts by volume of water and 500 parts by volume of ethyl acetate at 60° C. are added, and the aqueous layer is separated. The excess of starting material may be recovered from the ethyl acetate.

The aqueous portion is chilled in a cooling chamber at −10° C., whereupon the hydrochloride of 2-[N-(para-methyl-phenyl)-N-(meta'-hydroxy-phenyl)-amino-methyl]-imidazoline of the formula

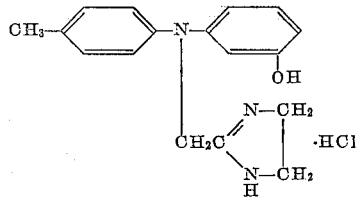

crystallizes. Upon being concentrated and cooled the mother liquor yields a further quantity of the hydrochloride. The combined quantities of hychloride are treated with a small quantity of cold water, dried with care, and washed with ethyl acetate. The product is then crystallized from a mixture of alcohol and ethyl acetate, and there is obtained a hydrochloride melting at 239–240° C.

The free base can be obtained from the aqueous solution of the hydrochloride by means of dilute ammonia solution. When recrystallized from dilute alcohol the base melts at 174–175° C.

*Example 3*

149.5 parts of N-(para-methoxy-phenyl)-phenylamine and 38.75 parts of 2-chloromethyl-imidazoline hydrochloride are heated in the manner described in Example 1, and the reaction product is treated with ether and water. The aqueous extract is concentrated under reduced pressure, the residue is evaporated twice more with alcohol in order to remove the water, and recrystallized from a mixture of alcohol and ethyl acetate.

In this manner the sparingly soluble 2-[N-(parahydroxy-phenyl)-N-phenyl-aminomethyl]-imidazoline crystallizes first. However, there is obtained chiefly the hydrochloride of 2-[N-(para-methoxy-phenyl)-N-phenyl-aminomethyl]-imidazoline of the formula

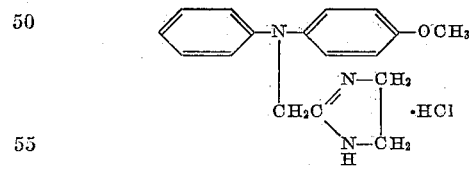

which crystallizes in the form of white crystals melting at 178–181° C. By means of dilute sodium carbonate solution or dilute ammonia solution there can be precipitated from the aqueous solution the base, which crystallizes after a short time. When recrystallized from alcohol it has a melting point of 109–111° C. It can be converted into the above described hydrochloride by means of an alcoholic solution of hydrochloric acid.

The same base is also obtained by reacting the sodium salt of N-(para-methoxy-phenyl)-phenylamine (obtained by means of sodamide in benzene solution) with 2-chloromethyl-imidazoline.

If N-(para-ethoxy-phenyl)-phenylamine or N-(para-phenoxy-phenyl)-phenylamine are used as starting materials, there are obtained in an analogous manner the hydrochloride of 2-[N-

(para-ethoxy-phenyl)-N-phenyl-amino-methyl]-imidazoline of the formula

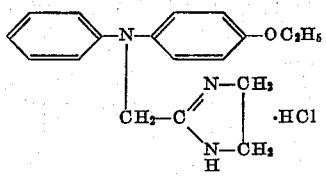

or 2-[N-(para-phenoxy-phenyl) - N - phenyl-amino-methyl]-imidazoline of the formula

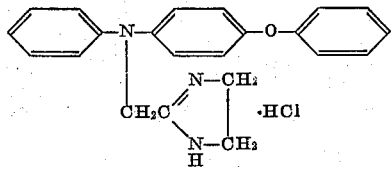

*Example 4*

39.84 parts of N-(para-methoxy-phenyl)-phenylamine and 23.75 parts of 2-chloromethyl-imidazoline hydrochloride in 100 parts by volume of ortho-dichloro-benzene are maintained for 10 hours at an oil bath temperature of 125° C. while stirring. The reaction product is diluted with ether, and extracted with water. From the aqueous solution the hydrochloride of 2-[N-(para-methoxy-phenyl)-phenyl-aminomethyl]-imidazoline described in Example 3 is obtained. There is also obtained as a by-product 2-[N-(para-hydroxy-phenyl)-N-phenyl - aminomethyl]-imidazoline, which is mentioned in Example 3 and is more closely described in Example 9.

*Example 5*

39.84 parts of N-(para-methyl-phenyl)-meta'-hydroxy-phenyl-amine and 15.50 parts of 2-chloromethyl-imidazoline hydrochloride are heated at 130–140° C. in 75 parts by volume of absolute alcohol for 12 hours in a closed vessel. After cooling, the whole is filtered, the mother liquor is concentrated under reduced pressure, and the residue is extracted with ethyl acetate and water. From the aqueous extract there is obtained, in the manner described in Example 2, the hydrochloride of 2-[N-para-methyl-phenyl)-N-(meta'-hydroxy-phenyl)-aminomethyl]-imidazoline, which after recrystallization from a mixture of alcohol and ethyl acetate melts at 239–240° C.

*Example 6*

39.84 parts of N-(para-methyl-phenyl)-meta'-hydroxy-phenyl-amine and 15.50 parts of 2-chloromethyl - imidazoline hydrochloride are heated at the boil in 100 parts by volume of normal butyl alcohol for 15 hours while stirring. After cooling, the butyl alcohol solution is filtered, and the filtrate is evaporated to dryness under reduced pressure. The residue is then taken up in water and ethyl acetate, and there is obtained from the aqueous solution, in the manner described in Example 2, the hydrochloride of 2-[N-(para-methyl-phenyl)-N-(meta'-hydroxy-phenyl)-aminomethyl]-imidazoline in the form of crystals melting at 239–240° C.

*Example 7*

About 1 part of hydrogen sulphide is introduced into a mixture of 238.3 parts of N-(para-methoxy-phenyl)-N-phenyl-amino-acetonitrile melting at 93–95° C. (obtained by the condensation of para-methoxy-diphenylamine with formaldehyde and hydrocyanic acid in glacial acetic acid) and 72.12 parts of ethylene diamine, and the mixture is heated on the water bath until ammonia ceases to be split off. After removing the excess of ethylene diamine, for example, by evaporation with alcohol under reduced pressure, the 2-[N-(para-methoxy - phenyl) - N-phenyl-aminomethyl]-imidazoline which remains behind is taken up in alcohol and mixed with alcoholic hydrochloric acid. The solution is clarified by filtration, and the hydrochloride of 2-[N-(para-methoxy-phenyl) - N- phenyl-aminomethyl]-imidazoline is precipitated by the addition of ethyl acetate. After recrystallization the hydrochloride melts at 178–181° C., and is identical with the product obtained as described in Example 3.

The same product is also obtained by heating the nitrile with ethylene diamine in the presence of carbon disulphite.

In this process the thioamide of N-(para-methoxy-phenyl)-N-phenyl-amino-acetic acid is intermediately formed. Obviously, pre-formed N - (para- methoxy - phenyl) - N - phenyl-amino-thioacetamide may also be used as starting material. Furthermore, N-(para-methoxy-phenyl)-N-phenyl-amino-acetonitrile may first be converted into the imido-ether, and the latter reacted with ethylene diamine directly or by way of N-(para-methoxy-phenyl)-N-phenyl-amino-acetamidine.

*Example 8*

185.22 parts of N-(meta-hydroxy-phenyl)-phenylamine and 77.50 parts of 2-chloromethyl-imidazoline hydrochloride are heated and worked up in the manner described in Example 2. In this manner the hydrochloride of 2-[N-(meta-hydroxy-phenyl)-N-phenyl-aminomethyl]-imidazoline is obtained, which melts at 191–194° C. after recrystallization from a mixture of alcohol and ethyl acetate, and has the formula

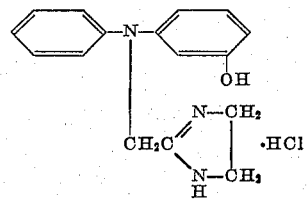

*Example 9*

92.61 parts of N-(para-hydroxy-phenyl)-phenylamine and 38.76 parts of 2-chloromethyl-imidazoline hydrochloride are brought into reaction and worked up in the manner described in Example 2. In this manner the hydrochloride of 2-[N-(para-hydroxy-phenyl)-N-phenyl-aminomethyl]-imidazoline melting at 225° C. is obtained. It has the formula

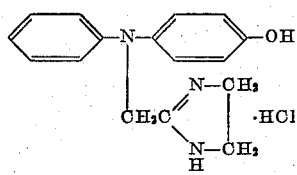

*Example 10*

11.91 parts of N-(para-methoxy-phenyl)-N-phenyl-aminoacetonitrile and 11.61 parts of ethylene diamine mono-paratoluene sulphonate are heated in a gentle current of nitrogen at 200° C., and the ammonia split off is titrated with previously prepared hydrochloric acid. The evolution of ammonia ceases after 1 hour. The cooled mass is triturated, extracted with a dilute solution of potassium carbonate and ether, and the ethereal solution is extracted with dilute hydrochloric acid. The base is reprecipitated from the hydrochloric acid extract by means of potassium carbonate, and taken up in ether. There is obtained from the ether in a yield of about 80 per cent. 2-[N-(para-methoxy-phenyl)-N-phenyl-aminomethyl]-imidazoline, which melts at 109–111° C. after recrystallization from a mixture of alcohol and ether and which is identical with the base described in Example 3. The hydrochloride of this base melts at 178–181° C. and shows no melting point depression in admixture with the hydrochloride described in Example 3.

*Example 11*

14.02 parts of N-(para-methyl-phenyl)-N-(meta'-acetoxy-phenyl)-aminoacetonitrile, 6.01 parts of ethylene diamine and about 0.1 part of hydrogen sulphide are heated on the water bath until the evolution of ammonia ceases. The reaction product is evaporated twice with alcohol under reduced pressure, and the residue is treated with a mixture of ethyl acetate and dilute hydrochloric acid. The hydrochloric acid extract, when concentrated by evaporation under reduced pressure, yields crystals which melt at 240° C. after recrystallization from alcohol. They dissolve to a clear solution in dilute caustic soda solution, which shows that the acetyl group has been split off. The hydrochloride of 2-[N-(para-methyl-phenyl)-N-(meta'-hydroxy-phenyl)-aminomethyl]-imidazoline so obtained exhibits no melting point depression in admixture with the hydrochloride obtained as described in Example 2.

The same hydrochloride is also obtained by using 0.1 part of carbon disulphide instead of hydrogen sulphide.

The nitrile used in the above example may be obtained in the following manner: 44.3 parts of the sodium salt of N-(para-methyl-phenyl)-meta'-hydroxy-phenylamine, suspended in 250 parts by volume of dry benzene, are mixed dropwise with 16.1 parts of acetyl chloride while cooling with water, and the whole is stirred for a few hours at room temperature and then for a short time at the boiling temperature. The benzene solution is washed with cold dilute caustic soda solution and then with water, dried and evaporated under reduced pressure. The N-(para-methyl-phenyl)-meta'-acetoxy-phenylamine which remains behind melts at 60° C. after crystallization from dilute alcohol. 24.13 parts of this compound in 150 parts by volume of glacial acetic acid are agitated with 4.74 parts of para-formaldehyde of 95 per cent. strength and 13.02 parts of potassium cyanide in 30 parts by volume of water for 12 hours in a closed vessel at 40° C., and then poured into 500 parts by volume of water. The oil which separates is taken up in ether, and washed with water, sodium carbonate solution and again with water. The ethereal residue, consisting of fairly pure N-(para-methyl-phenyl)-N-meta'-acetoxy-phenyl)-aminoacetonitrile is used directly.

*Example 12*

11.91 parts of N-(para-methyl-phenyl)-N-(meta'-hydroxy-phenyl)-aminoacetonitrile (obtained by the mild alkaline hydrolysis of the N-(para-methyl-phenyl)-N-(meta'-acetoxy-phenyl)-amino-acetonitrile used in Example 11) and 7.21 parts of ethylene diamine are heated in the presence of 0.3 part of hydrogen sulphide on the water bath until the evolution of ammonia ceases. The reaction product is worked up in the manner described in Example 11 and yields the same 2-[N-(para-methyl-phenyl)-N-(meta'-hydroxy-phenyl)-aminomethyl]-imidazoline hydrochloride, which likewise exhibits no melting point depression in admixture with the hydrochloride of Example 2.

The same hydrochloride is also obtained by heating N-(para-methyl-phenyl)-N-(meta'-hydroxy-phenyl)-aminoacetonitrile and ethylene diamine mono-para-toluene sulphonate in an oil bath until the formation of ammonia ceases, liberating the base from the reaction product, and converting the base into the hydrochloride.

*Example 13*

50.30 parts of para:para'-dihydroxy-diphenylamine and 19.38 parts of 2-chloromethyl-imidazoline hydrochloride are heated in an atmosphere of nitrogen in 150 parts by volume of butyl alcohol for 8 hours in a reflux apparatus. The butyl alcohol solution is then evaporated under reduced pressure. In order to separate the easily soluble dihydroxy-diphenylamine hydrochloride the residue is first dissolved in water and then precipitated with a saturated solution of sodium chloride. The oily imidazoline hydrochloride is again taken up in water, mixed with sodium acetate solution, and the remainder of the dihydroxy-diphenylamine is extracted several times with ether. From the aqueous portions the base, which rapidly becomes blue in color, is precipitated with sodium carbonate solution and then taken up in dilute hydrochloric acid. The solution is evaporated under reduced pressure, and the resulting hydrochloride of 2-[N:N-(para:para'-dihydroxy-diphenyl)-amino-methyl]-imidazoline is reprecipitated from a mixture of alcohol and ethyl acetate. It has a melting point of 227–230° C. and has the formula

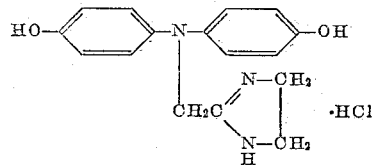

Having thus described the invention, what is claimed is:

1. A member selected from the group consisting of the 2-(N:N-diphenyl-aminoalkyl)-imidazolines bearing an hydroxyl group on at least one of the phenyl nuclei thereof, the 2-(N:N-diphenyl-aminoalkyl)-imidazolines bearing an alkoxy group on at least one of the phenyl nuclei thereof, and the salts of the said compounds.

2. A 2-(N:N-diphenyl-aminomethyl)-imidazoline bearing an hydroxyl group on at least one of the phenyl nuclei thereof.

3. A 2-(N:N-diphenyl-aminomethyl)-imidazoline bearing an hydroxyl group in the meta position of at least one of the phenyl nuclei thereof.

4. A 2-(N:N-diphenyl-aminomethyl)-imidazoline bearing an alkoxy group on at least one of the phenyl nuclei thereof.

5. A 2-(N:N-diphenyl-aminomethyl)-imidazoline bearing an alkoxy group in the meta position of at least one of the phenyl nuclei thereof.

6. The 2-[N-(para-methyl-phenyl)-N-(meta'- methoxy-phenyl)-aminomethyl]-imidazoline of the formula

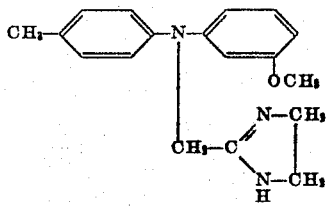

7. The 2-[N-(para-methyl-phenyl)-N-(meta'-hydroxy-phenyl)-amino-methyl]-imidazoline of the formula

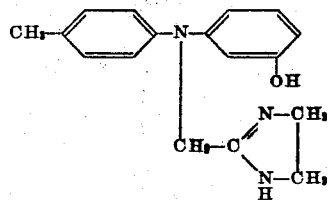

8. The 2-[N-(para-methoxy-phenyl)-N-phenyl-aminomethyl]-imidazoline of the formula

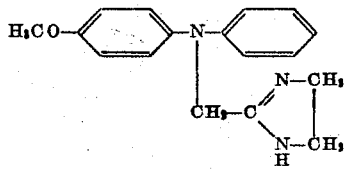

9. The 2-[N-(para-methyl-phenyl)-N-(meta'-methoxy-phenyl)-amino-methyl]-imidazoline hydrochloride of the formula

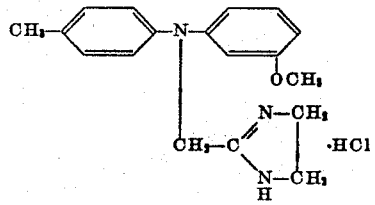

10. The 2-[N-(para-methyl-phenyl)-N-(meta'-hydroxy-phenyl)-amino-methyl]-imidazoline hydrochloride of the formula

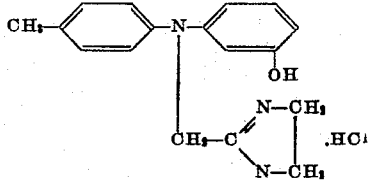

KARL MIESCHER.
ADRIAN MARXER.
ERNST URECH.

REFERENCES CITED

The following references are of record in the file of this patent:

UNITED STATES PATENTS

| Number | Name | Date |
| --- | --- | --- |
| 1,900,426 | Busdorf et al. | Mar. 7, 1933 |
| 1,980,102 | Semon | Nov. 6, 1934 |
| 2,449,241 | Miescher et al. | Sept. 14, 1948 |

Certificate of Correction

Patent No. 2,503,059                                                    April 4, 1950

KARL MIESCHER ET AL.

It is hereby certified that errors appear in the printed specification of the above numbered patent requiring correction as follows:

Column 1, line 35, for "hydroxylalkyl" read *hydroxyalkyl*; column 2, lines 16 and 17, for "phosphorous" read *phosphorus*; column 3, line 38, for "liberted" read *liberated*; column 6, line 18, for "disulphite" read *disulphide*;

and that the said Letters Patent should be read with these corrections therein that the same may conform to the record of the case in the Patent Office.

Signed and sealed this 4th day of July, A. D. 1950.

[SEAL]

THOMAS F. MURPHY,
*Assistant Commissioner of Patents.*